United States Patent [19]

Brinkmann et al.

[11] 4,176,967
[45] Dec. 4, 1979

[54] APPARATUS FOR THE PREPARATION OF THERMOPLASTIC MATERIALS

[75] Inventors: Heinz Brinkmann, Bennigsen; Horst Spielhoff, Aligse, both of Fed. Rep. of Germany

[73] Assignee: Hermann Berstorff Maschinenbau GmbH, Hannover Kleefeld, Fed. Rep. of Germany

[21] Appl. No.: 913,846

[22] Filed: Jun. 8, 1978

[30] Foreign Application Priority Data

Jun. 15, 1977 [DE] Fed. Rep. of Germany ....... 2726962

[51] Int. Cl.² ............................................... B29B 1/10
[52] U.S. Cl. ..................................... 366/83; 366/318; 425/207
[58] Field of Search ................................. 366/83–86, 366/318–324; 425/207, 208

[56] References Cited

U.S. PATENT DOCUMENTS

| 2,802,238 | 8/1957 | Colombo | 366/85 |
| 3,305,894 | 2/1967 | Boden et al. | 366/85 |
| 3,310,837 | 3/1967 | Wittrock | 366/85 X |
| 3,746,319 | 7/1973 | Blach | 366/83 |

*Primary Examiner*—Leonard D. Christian
*Attorney, Agent, or Firm*—Donald D. Jeffery

[57] ABSTRACT

Apparatus for the preparation and extrusion of plastics material or rubber, comprising a planet rolling extruder and a feed portion disposed upstream thereof with a main shaft of the planet rolling extruder being surrounded by planet shafts and being driven jointly with a feed-screw of the feed portion, in which some of the planet shafts at their ends adjacent the feed-screw are reduced in section to form transfer shaft portions and thereby receiving chambers for material fed to the planet rolling extruder by the feed portion. The transfer shaft portions may be cylindrical with a diameter smaller than the diameter of the root circle of the planet shaft gearing or may have, adjacent the feed-screw, a diameter smaller than the root circle of the planet shaft gearing and increase in diameter in a direction away from the feed-screw until they achieve the full shaft outline.

5 Claims, 4 Drawing Figures

APPARATUS FOR THE PREPARATION OF THERMOPLASTIC MATERIALS

The invention relates to apparatus for the preparation and extrusion of plastic materials or rubber with a plent rolling extruder and a feed-screw portion disposed upstream thereof, wherein a main shaft of the planet rolling extruder is surrounded by planet shafts.

Apparatus of this kind has been proposed wherein each alternate planet shaft of the planet rolling extruder is shortened to form a receiving chamber (DT-AS 21 58 246). It has been shown that this apparatus is not always satisfactory in respect of its feeding behaviour and that during processing of for example plastics foil shavings, damage can occur on the swirled gearing at the end of the receiving chamber. The explanation for this is that the foil shavings, which form a very compact material, accumulate so that a considerable pressure is exerted on the gearing of the planet shafts.

In addition such previously proposed apparatus has the disadvantage that the shortened planet shafts are not fixed in position and under some conditions of operation can be axially deflected.

The invention has among its objects to provide apparatus of the kind described at the outset in which materials to be moulded of every kind can be fed into it without the substantial risk of damaging the planet shaft gearing or the main shaft gearing.

According to the invention there is provided apparatus for the preparation and extrusion of plastics materials or rubber, comprising a planet rolling extruder and a feed portion disposed upstream thereof with a main shaft of the planet rolling extruder being surrounded by planet shafts and being driven jointly with a feed-screw of the feed portion, in which some of the planet shafts at their ends adjacent the feed screw are reduced in section to form transfer shaft portions and thereby receiving chambers for material fed to the planet rolling extruder by the feed portion.

The formation of the receiving chambers prevents a damaging accumulation of compacted material, e.g. foil shavings. This, therefore, ensures that the excessive feeding of foil shavings is avoided and provides the further advantage that there can be no dangerous point loading of the planet gearing. The planet gearing is not therefore subjected to excessive stress.

A further advantage is that, by means of the special construction of the receiving chambers, the planet shafts forming the receiving chambers can also be constructed of the same overall length as the remaining planet shafts. All the planet shafts can, therefore, rest against the downstream end of the feed-screw and be located in position.

The transfer shaft portions may be cylindrical in form and have a smaller diameter than the diameter of root circle of the planet shafts. The construction of the transfer shaft portions does not require any increased technical effort. The material to be moulded which enters the receiving chambers is fed into the gearing without any damaging accumulation.

In a modified embodiment the transfer shaft portions progress from a diameter smaller than the diameter of root circle of the planet shafts becoming continuously larger until they achieve the full shaft outline. By means of this advantageous construction of the transfer shaft portions and with it of the receiving chambers a continual increase in the volume of the planet shaft at the beginning of the planet rolling extruder is achieved. There is no abrupt build-up of pressure at the downstream end of the receiving chambers. An accumulation of compacted material, e.g. foil shavings, is no longer possible since accumulations are distributed due to the continuous increase in the shaft section. It is, therefore, almost impossible for an excessive feeding of small portions of the material to the gearing to occur.

The invention id diagrammatically illustrated by way of example in the accompanying drawings, in which.

Figure 1:
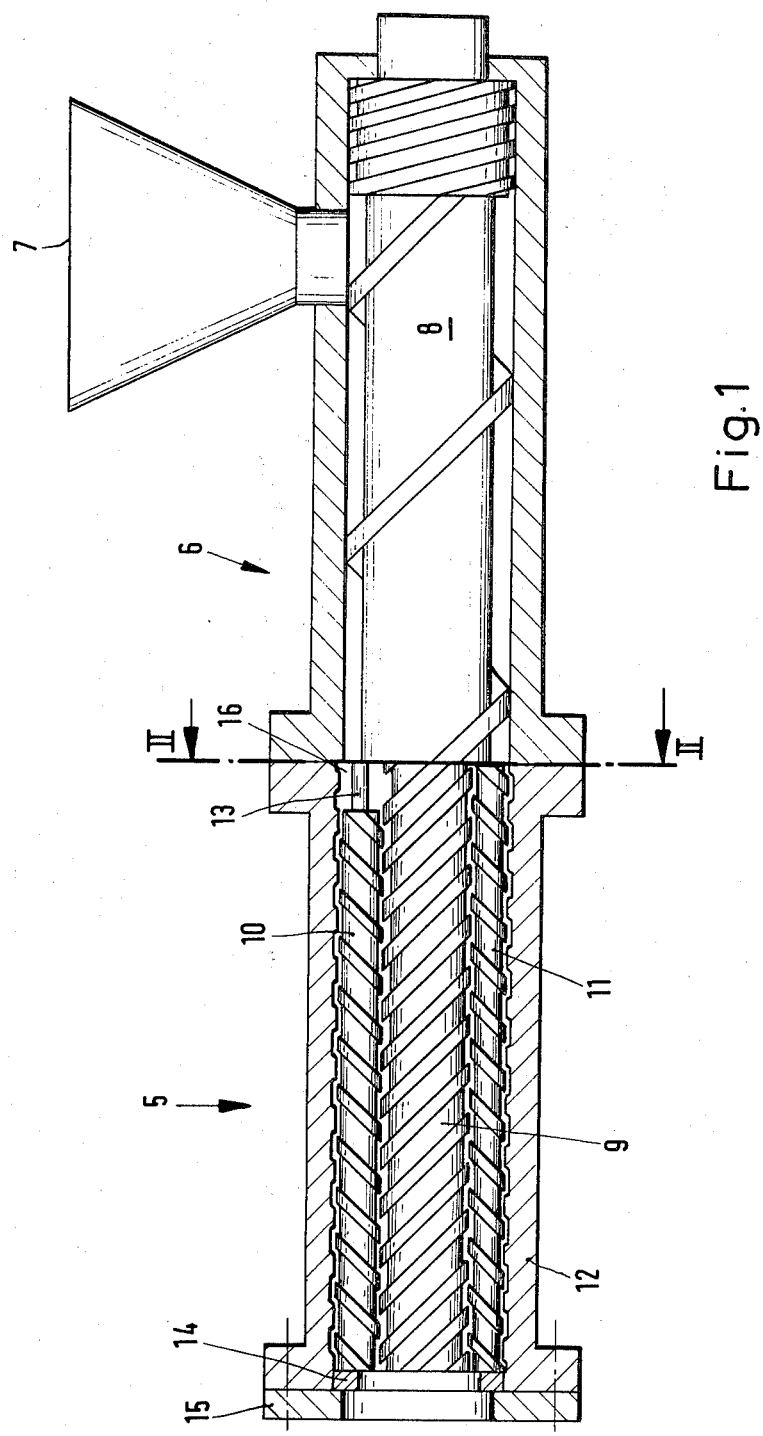
FIG. 1 shows a lateral view of a planet rolling extruder according to the invention with a portion of a feed-screw therefor.
Figure 2:
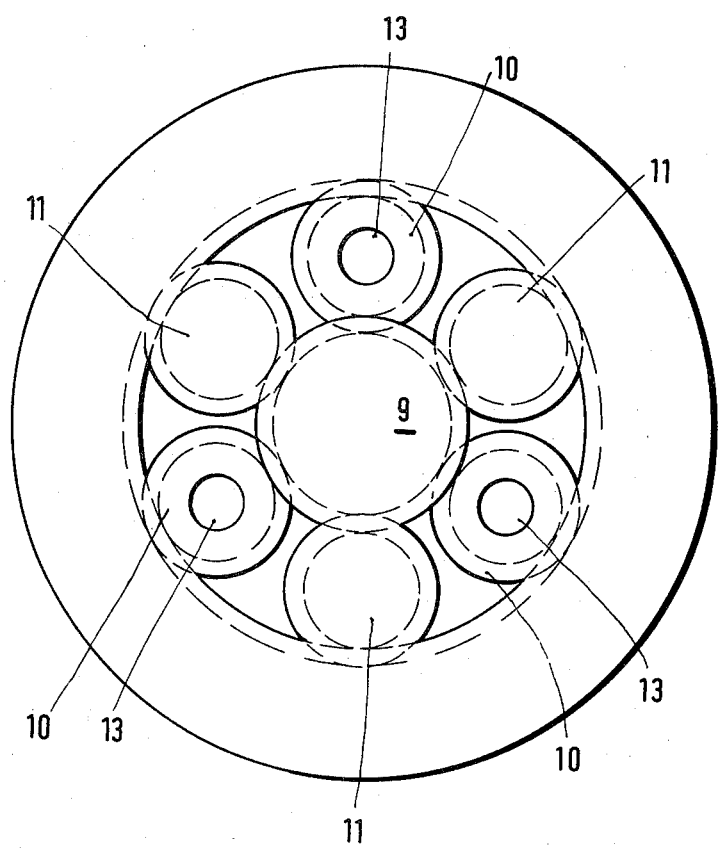
FIG. 2 is a view taken on Line II—II of FIG. 1 on a larger scale.

Referring to the drawings, a planet rolling extruder (FIG. 1) comprises a planet rolling portion 5 with a feed-screw portion 6 disposed upstream thereof. Moulding material to be processed is fed to the feed-screw 6 by way of a feed hopper 7. The rotating feed-screw 8 conveys the material to the beginning of the planet rolling portion 5. A main shaft 9 of the planet rolling portion 5 is connected to the feed-screw 8 in such a way as to prevent relative rotation. Six planet shafts 10, 11 are disposed around the periphery of the main shaft 9. The gearing of these planet shafts 10, 11 engages on the one hand with the gearing of the main shaft 9 and on the other hand with inner gearing of a cylinder 12 which surrounds them. As can be seen from FIGS. 1 and 2 jointly, each alternate one 10 of the planet shafts 10, 11 has a cylindrical transfer shaft portion 13 at its end which is adjacent the feed-screw 8, which transfer shaft portion 13 has a smaller diameter than the diameter of root circle of the gearing of the shaft 10. Receiving chambers 16 are thereby formed. The planet shafts 10, 11 have their in-feed ends bearing against the feed-screw 8. The discharge ends of the planet shafts 10, 11 rest against a thrust ring 14, which is inserted into the downstream end of the cylinder member 12 and is held there by means of an annular flange 15 bolted to the cylinder 12.

Figure 3:
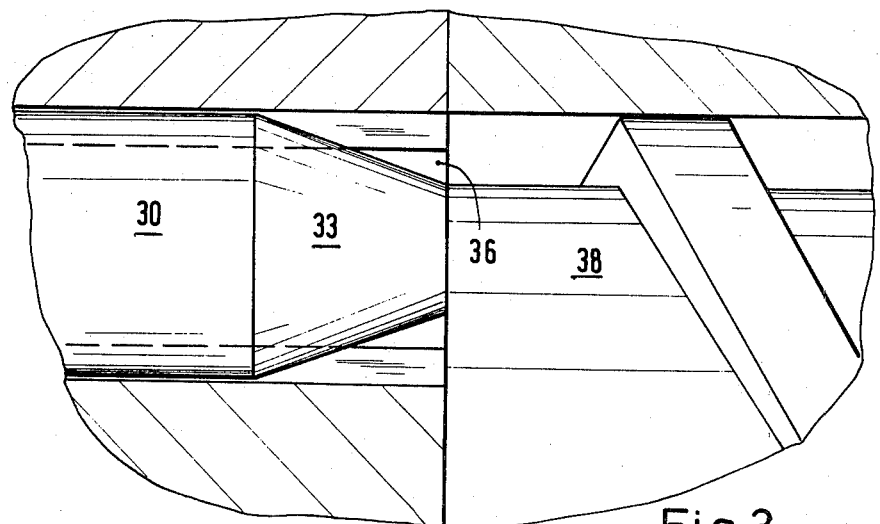
FIG. 3 is a detail view which shows a modified embodiment of a transfer shaft portion for the apparatus of FIGS. 1 and 2.

FIG. 3 shows a modified embodiment of transfer shaft portion wherein a planet shaft 30 has a tapered transfer shaft portion 33 forming a receiving chamber 36, the front end of the transfer shaft portion 13 rests against the feed-screw 38. The diameter of the transfer shaft portion 33 is smaller adjacent the feed-screw 38 than the diameter of root circle of the shaft gearing and increases in a downstream direction to the full shaft outline.

Figure 4:
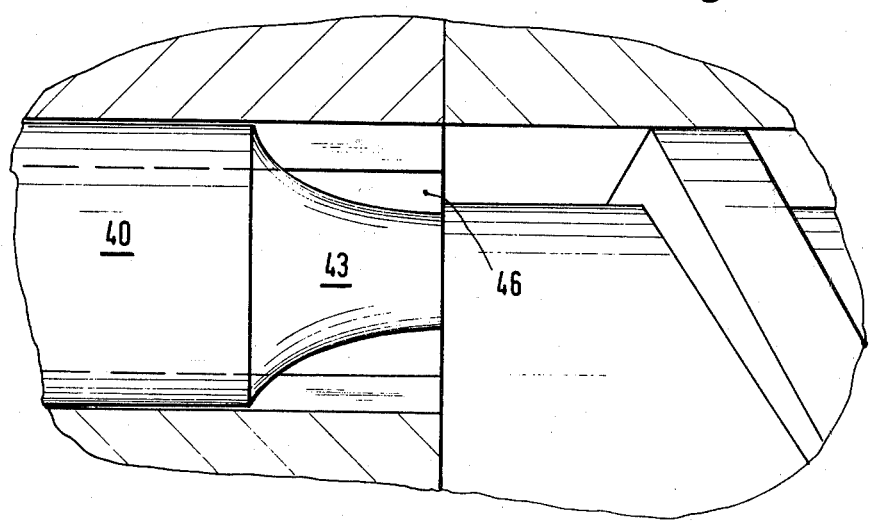
FIG. 4 is a detail view which shows a further curve-shaped embodiment of a transfer shaft portion for the apparatus of FIGS. 1 and 2.

In the embodiment shown in FIG. 4, a transfer shaft portion 43 of a planet shaft 40 has a curve-shaped construction and forms a receiving chamber 46. In this case too, the diameter of the transfer shaft portion 43 adjacent the feed-screw is smaller than the diameter of root circle of the shaft gearing. The diameter increases in the shape of a curve until it reaches the full shaft outline.

What is claimed is:

1. Apparatus for the preparation and extrusion of extrudable material in an extruding cylinder, comprising a planet rolling extruder and a feed portion having a feed-screw disposed upstream in said cylinder, said planet rolling extruder including a main shaft and planet shafts surrounding said main shaft, said main shaft being driven jointly with said feed-screw of said feed portion, wherein at least certain of said planet shafts at their ends adjacent said feed-screw are reduced in section to form transfer shaft portions having regions of reduced diameter relative to the root circle of said planet shafts, said regions of reduced diameter forming receiving chambers for material fed to said planet rolling extruder by said feed portion, said receiving chambers avoiding excessive feeding of material to said planet shafts thereby avoiding excessive stress on said plant shafts.

2. Apparatus as claimed in Claim 1, wherein said transfer shaft portions are of cylindrical construction throughout the length thereof and have a smaller diameter than the diameter of the root circle of said planet shafts.

3. Apparatus as claimed in claim 1, wherein said transfer shaft portions progress, in a direction away from said feed-screw, from a diameter smaller than the diameter of the root circle of the planet shaft gearing, becoming continuously larger until they achieve the full shaft outline.

4. Apparatus as claimed in claim 1 further including means for axially fixing said planet shafts relative to said feed-screw.

5. Apparatus as claimed in claim 4, wherein said means for axially fixing said planet shafts comprises a thrust ring mounted in said cylinder adjacent the discharge end thereof, the leading ends of said planet shafts engaging said thrust ring, the opposite, reduced diameter ends of said planet shafts bearing against said feed-screw.

* * * * *